R. B. PRICE.
APPARATUS FOR TREATING PLASTIC MATERIAL.
APPLICATION FILED MAR. 26, 1913.
1,156,096.
Patented Oct. 12, 1915.
2 SHEETS—SHEET 2.
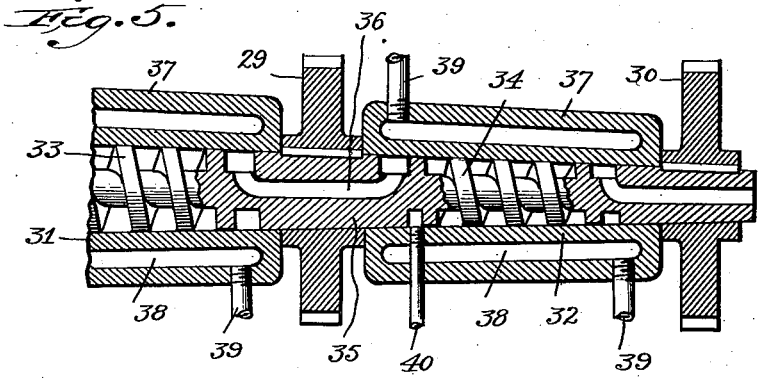
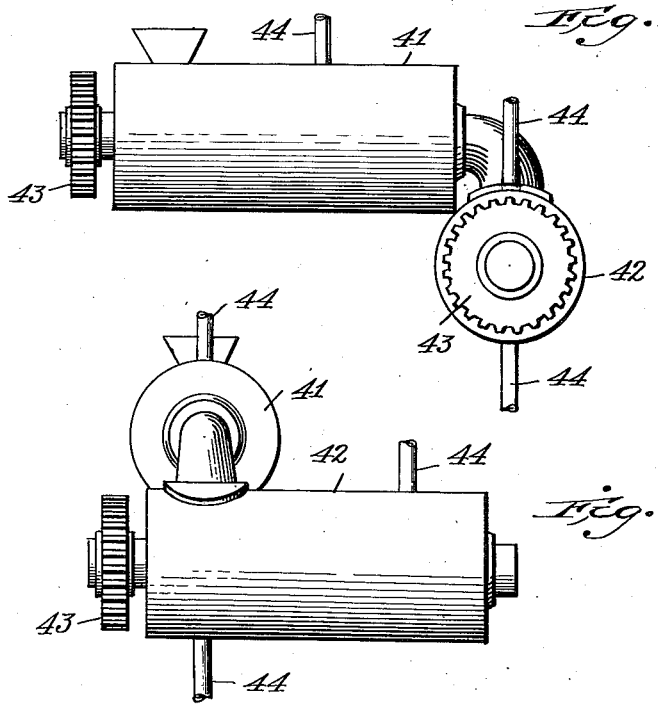

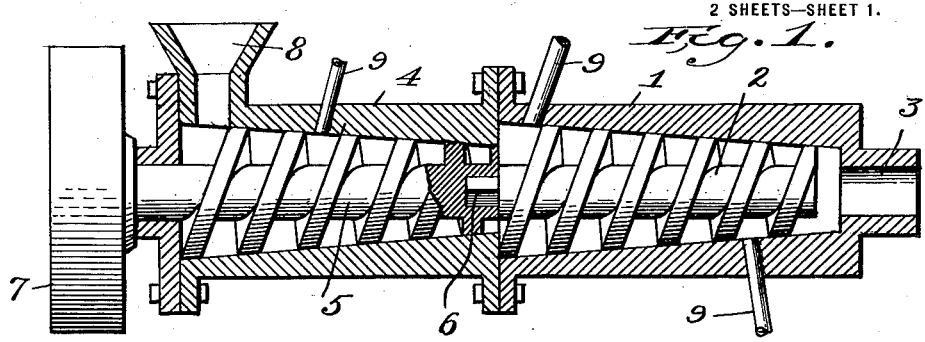
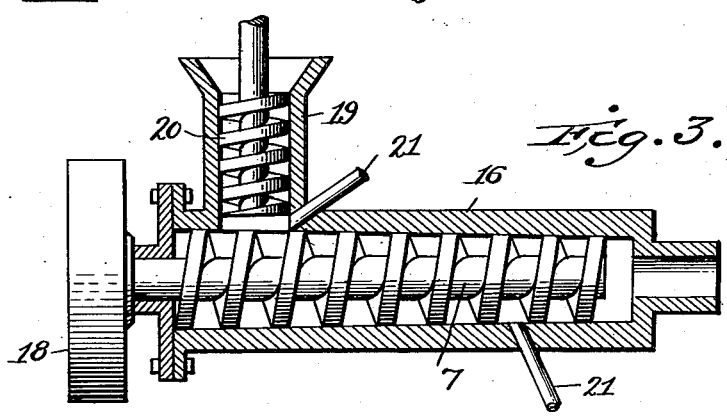
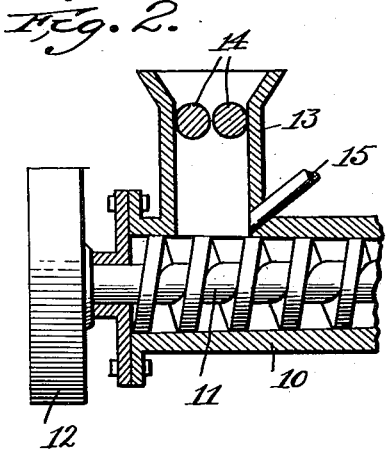
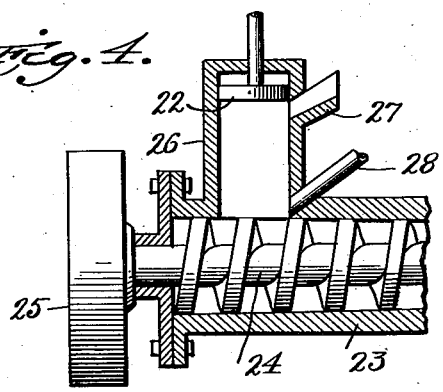

UNITED STATES PATENT OFFICE.

RAYMOND B. PRICE, OF NEW YORK, N. Y., ASSIGNOR TO RUBBER REGENERATING COMPANY, A CORPORATION OF INDIANA.

APPARATUS FOR TREATING PLASTIC MATERIAL.

1,156,096.  Specification of Letters Patent.  Patented Oct. 12, 1915.

Application filed March 26, 1913. Serial No. 756,885.

*To all whom it may concern:*

Be it known that I, RAYMOND B. PRICE, a citizen of the United States, residing in the borough of Manhattan, city of New York, State of New York, have invented new and useful Improvements in Apparatus for Treating Plastic Material, of which the following is a specification.

My invention relates to apparatus for treating plastic material, such as rubber and the like, wherein the same is subjected to the action of what is commonly known as a tubing or straining machine, and has for its primary object to provide an apparatus wherein an open feed is provided, and the material being acted on is subjected to the action of a vacuum to withdraw therefrom entrapped air, moisture and gases.

My present invention accomplishes the desired results by exerting the vacuum on the material while being treated, and by simultaneously sealing that portion of the apparatus where the vacuum is exerted, thus permitting an open feed of the material and an open discharge.

In the accompanying drawing: Figure 1 is a longitudinal sectional view of one form of apparatus. Fig. 2 is a similar view showing a different form of feed to the screw. Fig. 3 is a similar view showing still another form of feed. Fig. 4 is a similar view showing still another form of feed. Fig. 5 is a view similar to Fig. 1 showing a modified form of drive as well as a modified interior construction. Fig. 6 is an end elevation of still another modification. Fig. 7 is a side elevation of the same.

Referring more particularly to Fig. 1, the reference numeral 1 denotes the chamber of a tubing apparatus containing the feed screw 2 and having a single central discharge orifice 3 at one end. Bolted to the other end of the chamber 1 is a feed chamber 4, the two being disposed tandem and being each preferably tapered from their receiving toward their discharge ends, as shown. The feed screw 5 in the chamber 4 is provided with a central angular recess at its discharge end adapted to receive the similarly shaped reduced end 6 of the tubing screw 2, whereby the screws 2 and 5 may be driven by a common wheel 7 fixed to the projecting end of feed screw 5. A feed hopper 8 is provided for the chamber 4, while tapped into the two chambers at different points in their length are pipes 9 adapted to be connected to any suitable vacuum apparatus.

In operation the material to be treated is fed into the hopper 8 in the manner usual in devices of this character, and is carried along by the feed screw 5 toward the chamber 1, into which it discharges. The tapering of the chambers 1 and 4 in the same direction provides for the discharge of the material from the smaller end of chamber 4 into the larger end of chamber 1, thereby permitting a temporary expansion of the material, at which point I prefer to subject it to the direct action of the vacuum exerted through one of the pipes 9 whereby an effectual removal of air, moisture and gases will be obtained. By reason of the compression of the material in the chambers 1 and 4, due to its movement therethrough under the action of the screws 2 and 5, an effectual seal is provided throughout said chambers so that a most efficient vacuum may be exerted thereon. And I do not wish to limit myself to any particular number of points at which the vacuum is to be exerted on the material in the apparatus, as said vacuum may be applied at any desired number of points, as experience may dictate.

While I prefer to taper the chambers 1 and 4 as shown, I do not wish to limit myself to such construction, as the same may be varied in any suitable manner, as, for instance, by forming them of even diameter throughout, and of the same or of different sizes, or by forming either one of even diameter and the other tapering. So also I do not wish to limit myself to any particular form of drive for the screws, which may be provided at either end of the device or at any intermediate point and in any suitable manner. And said screws may be similarly pitched, or their pitch varied, or they may be driven separately and their speed varied at will. So also a control of the feed or the discharge of the material, or both, may operate to controllably affect the vacuum.

In Fig. 2 I have shown a tubing chamber 10 having screw 11 and drive wheel 12 and being provided with a feed hopper 13 in which are disposed feed rolls 14 whereby the material is fed to the chamber 10, and which act, in conjunction with the material being fed, to seal the said hopper 13 below said rolls, whereby a vacuum exerted through pipe 15 will be unbroken.

In Fig. 3 I have shown still another modification, the tubing chamber 16, screw 17, drive wheel 18, and hopper 19 being employed, the feed rolls 14 being replaced by a feed screw 20, which will act in a manner similar to feed screw 5 in Fig. 1, the vacuum pipe 21 supplying the vacuum at the proper point. Or I may employ a feed plunger 22, as shown in Fig. 4, wherein the tubing chamber 23, screw 24, and drive wheel 25 are like the corresponding parts in the other modifications, the hopper 26 being preferably closed at its top and being provided with a side feed 27 below the plunger 22 when the latter is at the uppermost limit of its stroke, and the vacuum pipe 28 being preferably disposed as in Figs. 2 and 3.

In all of these constructions the primary object is to provide means whereby the material may be subjected to the action of the screw 2, 11, 17 or 24, as the case may be, and at the same time be effectually sealed against the breaking of a vacuum exerted upon the material in its passage through the machine. And, like Fig. 1, I contemplate the application of the vacuum at any number of points in the different devices.

In Fig. 5 I have shown a tandem construction like Fig. 1, but in which there are two drive gears or wheels 29, 30, the former being disposed intermediate the chambers 31 and 32. And, while I have shown in said figure the two screws 33 and 34 connected at 35 to be driven together, I wish to be understood as contemplating their being made separate and driven separately, and whether or not vacuum or differential pressure are applied. And the apparatus may be made in any desired number of sections, either connected for a common drive or disconnected for separate drives, and at the same or variable speeds, and with their screws at the same or different pitches. In said figure the connection 35 is provided with a passage 36 for the material, but this feature may be varied as may be desired. I have also shown in said figure the chambers 31 and 32 jacketed at 37, whereby steam or other heating or refrigerating medium may be introduced into the annular chambers 38 formed thereby for the purpose of exerting a controllable temperature upon the material being treated, a circulation of the medium being maintained through pipes 39. And I contemplate this temperature control not only in the apparatus shown in said figure, but also in all the other constructions illustrated in my drawings. And I further contemplate such temperature control in any other desired manner. And, while I have shown but a single vacuum pipe 40 applied to this construction, it will be understood that the vacuum may be exerted at any desired number of points in the apparatus, as in Fig. 1.

In Figs. 6 and 7 I have shown still another modified construction, the tubing machine 41, which acts as a feed chamber, being disposed at an angle with respect to the tubing chamber 42, the screws thereof being separately driven from their gears 43, and being connected by a goose-neck connection 44 which is preferably enlarged toward its discharge point into tubing machine 42, as shown. This provides a compact construction in which the discharge from chamber 41 is in close relation to the feed end of chamber 42. The vacuum may be exerted on said chambers through pipes 44 disposed at any desired points, and said chambers may also be jacketed, as in the Fig. 5 construction, or otherwise equipped to provide for temperature control.

In the formation of articles such as rubber shoe soles and the like when the material is passed between forming rolls it is important that the material be presented to said rolls in solid or compact form, so that the results obtained by previously exerting a vacuum thereon in the tubing chamber shall not be lost through folding or rolling the material in order to present it to the forming rolls, which folding or rolling necessarily results in entrapping more or less air. By providing a single discharge for the tubing chamber like discharge orifice 3 in Fig. 1 I am enabled to obtain an enlarged continuous solid discharge of material in compact form, which may be used in the forming rolls without folding or rolling, thus preserving all the advantages obtained by its subjection in the tubing chamber to the action of the vacuum.

I also contemplate the employment of means whereby "bleeding to atmosphere", or other differential or controllable pressure may be utilized in addition to or in place of the vacuum as described.

Having thus described my invention, what I claim as new and desire to secure by Letters Patent is:

1. Apparatus for treating material, embodying continually operable tubing mechanism adapted for continually receiving material at one end and delivering it at the other end, an exit aperture at said delivery end adapted to form the material, an open feed for said tubing mechanism positioned at the receiving end of the mechanism, means for exerting a vacuum on the material in said apparatus, and means for sealing said apparatus against ingress of air through the feed side to the area of vacuum application.

2. Apparatus for treating material, embodying continually operable tubing mechanism adapted for continually receiving material at one end and delivering it at the other end, an exit aperture at said delivery end adapted to form the material, an open feed for said tubing mechanism positioned at the receiving end of the mechanism, a feed mechanism operating in conjunction with said open feed for feeding the material to said tubing mechanism and for sealing said apparatus on that side, and means for exerting a vacuum on the material in said apparatus.

3. Apparatus for treating material, embodying continually operable tubing mechanism adapted for continually receiving material at one end and delivering it at the other end, an exit aperture at said delivery end adapted to form the material, a screw feed for the same positioned at the receiving end of the mechanism, an open hopper for said screw feed, and means for exerting a vacuum on the material in said apparatus.

4. Apparatus for treating material, embodying continually operable tubing mechanism adapted for continually receiving material at one end and delivering it at the other end, an exit aperture at said delivery end adapted to form the material, a screw feed for the same positioned at the receiving end of the mechanism, the two being disposed tandem, an open hopper for said screw feed, and means for exerting a vacuum on the material in said apparatus.

5. Apparatus for treating material, embodying a tubing mechanism, a screw feed for the same, the two being disposed tandem and having an enlarged area at the point of discharge from the screw feed mechanism to the tubing mechanism, and means for exerting a vacuum on the material at substantially said point.

6. Apparatus for treating material, embodying a tubing mechanism, a screw feed for the same, the two being disposed tandem and having their chambers tapered and disposed with the smaller end of the screw feed chamber discharging into the larger end of the tubing chamber, and a vacuum pipe tapped into the apparatus.

7. An apparatus for treating vulcanizable plastic materials embodying therein a chambered casing having feed and discharge openings for the plastic material, a port intermediate said openings through which fluids are removed, vacuum creating means communicating with said chamber through said port, and means continually operative to continually express fluids from the plastic material and to continually feed said material from said feed opening through said discharge opening.

8. An apparatus for treating vulcanizable plastic materials embodying therein a chambered casing having feed and discharge openings for the plastic material, a screw revolubly mounted in the chamber of said casing and extending from said feed opening to said discharge opening to provide tubing mechanism, said discharge opening being constricted whereby the plastic material is compressed while passing through said chamber, means whereby the plastic material is compressed and delivered through said feed opening, the capacity of said chamber adjacent said feed opening being relatively greater than that of said opening whereby the material may expand upon delivery to said chamber, and vacuum creating means communicating with said chamber adjacent said feed opening whereby fluids expressed from said material are withdrawn from said chamber.

In testimony whereof, I have hereunto set my hand in the presence of two subscribing witnesses.

RAYMOND B. PRICE.

Witnesses:
 CHARLOTTE M. SCHULE,
 MAY V. SMITH.